United States Patent [19]

Chi et al.

[11] Patent Number: 5,121,258
[45] Date of Patent: Jun. 9, 1992

[54] APPARATUS FOR ANHYSTERETIC DUPLICATION OF A FLEXIBLE MAGNETIC DISK

[75] Inventors: Chao S. Chi; Frederick J. Jeffers, both of Escondido; Richard J. McClure, San Diego, all of Calif.

[73] Assignee: Eastman Kodak Company, Rochester, N.Y.

[21] Appl. No.: 744,049

[22] Filed: Aug. 12, 1991

[51] Int. Cl.$^5$ .............................................. G11B 5/86
[52] U.S. Cl. .......................................... 360/17; 360/16
[58] Field of Search ................................. 360/15–17, 360/119, 127, 130.34

[56] References Cited

U.S. PATENT DOCUMENTS

| | | | |
|---|---|---|---|
| 2,867,692 | 1/1959 | Camras | 360/17 |
| 3,277,244 | 10/1966 | Frost | 179/100.2 |
| 3,986,205 | 10/1976 | Fayling | 360/2 |
| 3,995,313 | 11/1976 | Fayling | 360/15 |
| 4,071,869 | 1/1978 | Feieraband et al. | 360/17 |
| 4,363,038 | 12/1982 | Fayling | 360/17 |
| 4,422,106 | 12/1983 | Sawazaki | 360/17 |
| 4,644,416 | 2/1987 | Yamada | 360/17 |
| 4,819,102 | 4/1989 | Shirai et al. | 360/17 |

FOREIGN PATENT DOCUMENTS 63-183623  7/1988  Japan.

Primary Examiner—Vincent P. Canney
Attorney, Agent, or Firm—Dennis P. Monteith

[57] ABSTRACT

Apparatus, for recording information on a flexible magnetic slave disk by contact transfer of information recorded on a flexible magnetic master disk, includes a U-shaped electromagnetic device terminating, respectively, in a first planar pole tip axially aligned with a second movably mounted planar pole tip, to define predominately a single closed-loop flux-conducting path extending through a contact-transfer zone between the pole tips. A linear actuator, coupled to the movable pole tip, serves for releasably mounting the master disk in intimate facing relationship with the slave disk in the contact-transfer zone between the planar pole tips. Control circuitry applies an alternating electrical signal to the U-shaped electromagnetic device to develop an alternating magnetic field in the closed-loop flux-contacting path that produces a corresponding alternating magnetic transfer field extending axially in the contact-transfer zone between the planar pole tips.

8 Claims, 2 Drawing Sheets

APPARATUS FOR ANHYSTERETIC DUPLICATION OF A FLEXIBLE MAGNETIC DISK

BACKGROUND OF THE INVENTION

1. Field Of the Invention

This invention relates to magnetic recording, and in particular to anhysteretic duplication of a pre-recorded floppy diskette.

2. Description Relative To The Prior Art

Magnetic recording media play a critically important role in the storage of digital data. A floppy diskette or disk is currently one of the most commonly used magnetic media; millions of both pre-recorded and unrecorded diskettes are sold for use in personal, office and workstation computer systems.

A diskette must be appropriately formatted before it can be utilized in a computer system. Formatting involves recording markers on the diskette which divide the recording surface into identified sectors, and which provide synchronizing signals essential in recording and reading information on the diskette. High-track-density applications of formatting may also include writing tracking servo signals over the recording surface. Formatting can be a very time consuming job, and an unformatted diskette is usually formatted on a diskette drive of the user's system by recording formatting signals under control of the disk operating system (DOS) of the computer. Pre-formatted diskettes are available in the marketplace, and in the prior art such diskettes have generally also been formatted in so-called real time by the manufacturer on standard disk drives. Using the DOS of an associated computer, these diskettes are individually formatted by means of signals applied to the recording head of the disk drive in substantially the identical manner to the process used in a personal computer diskette formatting operation.

There is also an extremely large market for pre-recorded diskettes containing application programs. Word processing programs, database programs, computational programs, and games programs are just a few of the myriad pre-recorded programs available on diskettes. Generally, these programs have similarly been transferred from master recordings to slave diskettes by conventional re-writing. The master is read by a standard disk drive, and the read signals are fed in real time to one or more satellite recording drives on which the slave diskettes are mounted. This method of duplication, which is essentially the same as the pre-formatting method described above, is similarly slow, laborious, and expensive to implement.

It is also known in the art that a magnetic pattern may be anhysteretically transferred from a master medium to a slave medium by means of a magnetic transfer field applied to the master and slave. In anhysteretic processing, the master medium, which typically has a coercivity of about three times that of the slave medium, is placed in intimate contact with the slave medium. The in-contact master and slave are both subjected to a decreasing-amplitude alternating-polarity magnetic field. The transfer field is not of great enough strength to substantially affect the magnetization of the master; the transfer field does, however, successively switch the magnetization of the magnetic particles of the slave between two magnetic states. As the amplitude of the transfer field is decreased, the remanent magnetization of the slave assumes a final value proportional to the magnetization of the master.

Kokai No. 63-183623 discloses apparatus for pre-formatting a flexible slave disk by an anhysteretic transfer process. For that purpose, the flexible disk is mounted on a rotatable shaft between opposing poles of a pair of electromagnets which cooperatively provide a magnetic transfer field. In order to subject opposite surfaces to a transfer field of similar intensity, the flexible disk is held in a fixed plane midway between opposing poles of the two electromagnets. This is accomplished by sandwiching the slave disk between a pair of rigid or hard disks, which also serve as pre-formatted master media.

Although pre-formatted information is duplicated on a flexible disk by an anhysteretic transfer process, the apparatus of 63-183623 introduces additional cost and complexity into the duplication process. First, such apparatus is of a hybrid form. That is, a hard disk drive is required to pre-format the two master disks, whereas a soft or floppy disk drive is needed for reading the pre-formatted flexible disk. Second, the two electromagnetics and their associated drive coils must have matched magnetic characteristics in order to subject opposing surfaces of the flexible disk to a magnetic transfer field of substantially the same intensity.

SUMMARY OF THE INVENTION

In view of the foregoing, an object of the present invention is to provide apparatus suitable for a low-cost operation for effecting an anhysteretic transfer onto a flexible slave diskette.

To achieve an object characterized by low cost, the anhysteretic transfer of information onto a floppy slave diskette, in accordance with the invention, occurs from a master medium consisting of a floppy diskette, not a hard disk as is taught in the prior art. More specifically, the object of the invention is achieved by means of apparatus comprising an electromagnetic device, shaped to define predominately a single closed-loop flux-conducting path, terminating, respectively, in a first planar pole tip that is axially aligned with a second movably mounted pole tip. An actuator, associated with the movable pole tip, serves for releasably mounting a master floppy diskette in intimate facing relationship with a slave floppy diskette in a contact-transfer zone between the two planar pole tips. Control circuitry serves for applying an alternating electrical signal to the electromagnetic device to develop an alternating magnetic field in the closed-loop flux-conducting path that produces a corresponding alternating magnetic transfer field extending axially in the contact-transfer zone between the planar pole tips.

For recording information on a double-sided flexible slave disk, the slave disk is clamped between a pair of flexible master disks, with each master disk being in intimate facing relationship with one of the pole tips.

A master floppy diskette is composed of a magnetic recording surface applied to a conventional floppy substrate, and is recorded by means of a standard floppy disk drive. Preferably, a master recording surface is coated with metal particles having an easy axis of magnetization in the plane of the master and a hard axis of magnetization orthogonal to the plane of the master. When mounted on apparatus in accordance with the invention, the direction of the transfer field lies orthogonal to the recording surface in the direction of the hard axis. The slave diskette, on the other hand, comprises a magnetic coating (single or double sided) having an easy axis of magnetization orthogonal to the plane of the slave, whereby the transfer field lies in the direction of the slave's easy axis. This configuration allows effective duplication without excessive demagnetization of a master disk by the transfer field. For optimum transfer, the maximum amplitude of the transfer field is between 1.75 times the coercivity of the master magnetic coating, and the coercivity of the master magnetic coating divided by 1.75.

This advantage, as well as other advantages of the invention, will become more apparent in the detailed description of a preferred embodiment presented below.

BRIEF DESCRIPTION OF THE DRAWINGS

The invention will be described with reference to the figures, of which.

DETAILED DESCRIPTION OF A PREFERRED EMBODIMENT

Figure 1:
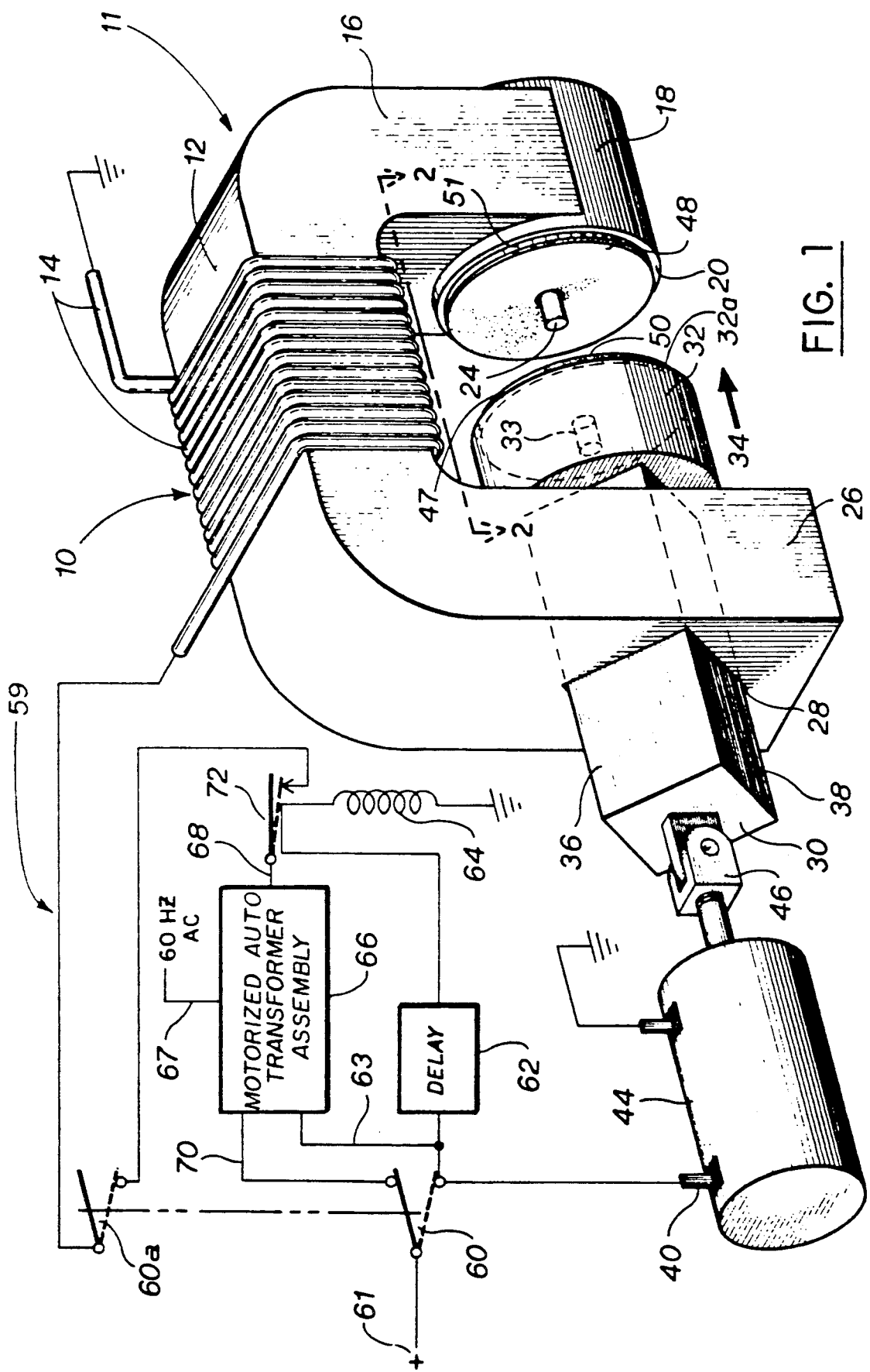
FIG. 1 is an illustration of diskette duplication apparatus in accordance with the invention.

Referring to FIG. 1, diskette duplicating apparatus 10, in accordance with the invention, includes an electromagnetic device, denoted generally 11, comprising a high permeability U-shaped electromagnet 12 of soft magnetic material having a coil 14 wound on a back bar of the electromagnet. One leg 16 of the electromagnet 12 terminates in a cylindrically shaped pole piece 18 whose planar pole tip 20 has a diameter greater than either the diameter of a master diskette to be duplicated or a corresponding slave diskette. A precision spindle 24 is located along a central axis of the pole piece 18, the spindle having a diameter just sufficient to clear the hole in the center in either the slave or the master diskette. A second leg 26 of the U-shaped electromagnet 12 contains an aperture 28 in which an elongated magnetic member 30 is positioned for slidable movement relative to the pole piece 18. Attached to one end of the member 30 is a second cylindrical pole piece 32 whose planar pole tip 32a has the same diameter as the pole piece 18. The body of the pole piece 32 has an axial hole 33, aligned with the precision spindle 24, which serves for accepting the spindle 24 when the member 30 is advance such that the pole pieces 18, 32 are immediately adjacent each other.

The electromagnetic device 11, comprising the U-shaped electromagnet 12 and the opposing pair of cylindrically shaped pole pieces 18 and 32 terminating, respectively, in the axially aligned planar pole tips 20 and 32a, serves to provide predominately a single closed-loop flux-conducting path extending through the gap or space between the pole tips. This closed-loop flux-conducting path functions to transfer a magnetomotive force, generated by the coil 14, across the gap between the pole tips 20, 32a. A portion of the magnetomotive force generated by the coil 14, however, is dropped across any reluctance present in magnetic structure defining the closed-loop path. Therefore, in order to transfer a maximum magnetic field to the gap between the pole tips 20, 32a, it is necessary that the reluctance of the flux-conducting path be minimal. To that end, the member 30 fits snugly but slidably in the aperture 28 to minimize the separation between the member 30 and the leg 26 of the U-shaped electromagnet 12. Also, the member 30 is sized so that its surfaces, for example 36, 38, which are in contact with opposing surfaces of the leg 26, and through which magnetic flux passes, are maximized.

In order to duplicate information on a double-sided slave diskette, two master diskettes, composed of substrates 51, 47 coated with respective magnetic surfaces 48, 50, are fastened, respectively, to the planar tips of the pole pieces 18, 32 by suitable means such as an adhesive or the like. The double-sided slave diskette is then mounted onto the spindle 24 and the member 30 is advanced in the direction of the arrow 34, in a manner to be described more fully below. The member 30 moves until the pole pieces 18, 32 clamp the slave diskette in a contact-transfer zone between the planar pole tips 20, 32a, in intimate contact between the magnetic surfaces 48, 50 of the two master diskettes.

The member 30 is advanced by supplying power at a terminal 40 of a linear actuator 44 which drives the member 30 by means of a coupling 46. For that purpose, an operator controlled switch 60 is depressed, thereby applying a DC voltage 61 through the make contact of the switch 60 to terminal 40 of the linear actuator 44. In response thereto, the linear actuator 44 advances the pole piece 32, via the coupling 46 and the member 30, in the direction of the arrow 34. The master diskettes, having substrates 51, 47 bonded by the aforementioned adhesive to the planar faces 20, 32a of the pole pieces 18, 32, hold a slave diskette (not shown) in the contact-transfer zone in intimate contact therebetween when the member 30 is fully advanced.

The DC voltage 61 is also applied through the switch 60 to a delay 62 whose output drives a relay 64. The delay 62 serves to ensure that the actuator 44 has completed its travel before the relay 64 is activated.

The voltage 61 is also applied through the switch 60 to a dual-input motorized auto transformer assembly 66 comprising an auto transformer (not shown), which is energized by a 60-Hz voltage source applied to a control line 67, and a bi-directional DC motor (also not shown), which serves to drive a rotor of the auto transformer. When the DC voltage 61 is applied to a first DC input 63, the bi-directional motor drives the auto transformer so that an AC voltage at an output 68 of the assembly 66 decreases. When the voltage 61 is applied to a second DC input 70, however, the DC motor rotates in the opposite direction whereby the AC voltage at the output 68 is caused to increase.

The motorized auto transformer assembly 66 is provided with internal limit switches which stop the motor rotation when the auto transformer is driven to either end of its range. The AC voltage at the output 68 is transferred through the make contact 72 of the relay 64 and also through a serially connected contact 60a, which is closed as long as the switch 60 is depressed, as shown diagrammatically. The AC output voltage of the auto transformer assembly 66 is thereby applied to the coil 14 of the electromagnet 12 which consequently generates a magnetic transfer field in the contact-transfer zone between the tips 20, 32a of the pole pieces 18, 32.

It will be recalled that the DC voltage applied at input 63 causes the output voltage of the auto transformer assembly 66 to decrease. In doing so, the voltage falls linearly from a maximum value to zero volts as the DC motor of the assembly 66 continuously drives the auto transformer from the high end of its range to the low end. Thus, the magnetic transfer field generated by the electromagnet device 11 also linearly falls from a maximum field to a zero field, resulting in the duplication of information on the two master diskettes on the respective surfaces of the double-sided slave diskette.

After the output of the assembly 66 has dropped to zero volts, the operator releases the switch 60, which breaks the current path to the coil 14 and simultaneously de-energizes the linear actuator 44. The linear actuator has an internal spring return (not shown), which withdraws the member 30 to separate the pole pieces 18, 32 from each other. The operator then removes the slave diskette from the spindle 24, and reloads a new diskette for the next operating cycle. When the switch 60 is released, the DC voltage 61 is applied to the second input 70 of the motorized auto transformer assembly 66, which drives the motor so that the auto transformer is returned to its maximum output voltage 68 position. Since the contact 60a is now open, no current can flow to the coil 14 during this part of the cycle. Accordingly, there is no danger of applying an unwanted magnetic field to the slave diskette prior to its removal from the spindle 24.

Figure 2:
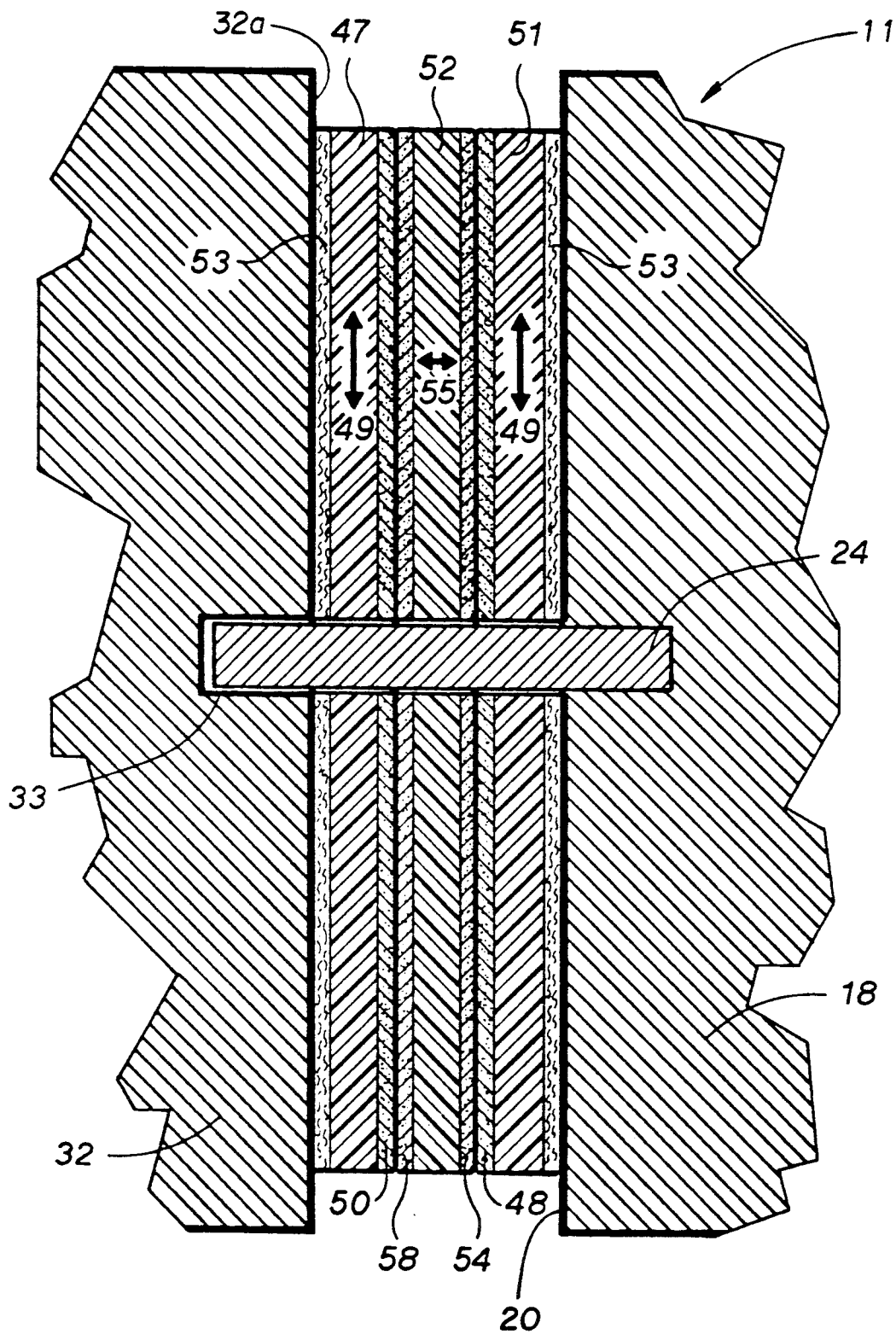
FIG. 2 is a cross-sectional view, taken along the lines 2—2 of FIG. 1, showing a slave diskette sandwiched between a pair of opposing master diskettes.

FIG. 2 shows the electromagnetic device 11 in its disk-clamping position. As shown, the two master diskettes having substrates 51, 47 are bonded to the pole pieces 18, 32 by use of an adhesive 53, and a slave diskette having a substrate 52 is mounted on the spindle 24. The surfaces 48, 50 of the two masters, which are preferably composed of metal particles having their respective easy axes, denoted 49, in the planes of the surfaces 48, 50 and their hard axes orthogonal thereto, are in intimate contact with the magnetic surfaces 54, 58 of the slave disk 52. The surfaces 54, 58 preferably contain magnetic particles whose respective easy axes 55 are orthogonal to the surfaces 54, 58. For example, BaFe platelets are particles which can have their easy axis so oriented. A decreasing amplitude AC magnetic transfer field, emanating from the pole tips 18, 32, passes through the magnetic surfaces 48, 54, 58, 50, thereby effecting a transfer of the information recorded on the surfaces 48, 50 to the surfaces 54, 58, in a manner known in the art.

The apparatus 10 is designed for rapid loading and unloading of a slave diskette, leading to low-cost, high-volume duplication. To those ends, it will be appreciated that the adhesive 53, used to bond the master diskettes to the pole pieces 18, 32, is of a non-permanent character allowing for rapid replacement of the master diskettes as required. Furthermore, the two master disks and the slave disk are composed preferably of standard floppy substrates of polyethylene terephthalate (PET). The use of a PET substrate allows the master disks to be recorded by means of conventional floppy disk recorders; no special recording apparatus is required further reducing duplication costs.

Even though a substrate of a conventional floppy disk has a thickness on the order of only seventy-six microns, cross talk through the slave substrate 52, between the recording of the master surface 48 to the slave surface 58 and the master surface 50 to the slave surface 54, is negligible. This is because the signal amplitudes from the surfaces 48, 50 fall off in accordance with the well known spacing loss expression $55d/\lambda$(db), where d is the distance from the recorded surface and $\lambda$ is the recorded signal wavelength. For example, the amplitude of a signal having a wavelength of seventy-six microns, recorded at the master surface 50, is attenuated by 55db when duplicated at the surface 54 of the slave diskette. The bit density on a typical high density disk is on the order of 380 bits per millimeter. A 76-micron wavelength, on the other hand, corresponds to a bit density of only 25 bits per millimeter. In other words, the shorter wavelength signals used in a typical disk recording will be attenuated much more than will a 76-micron wavelength signal. Therefore, cross talk to the opposite sides of the slave disks from the masters may be ignored. This allows two-sided duplication onto a floppy slave from two masters in a single transfer cycle.

The invention has been described in detail with particular reference to preferred embodiments thereof, but it will be understood that variations and modifications can be effected within the spirit and the scope of the invention. For example, it will be clear to those skilled in the art that the invention is equally applicable to the duplication of information on a single-sided slave diskette. For that purpose, a single-sided slave diskette is clamped in a contact-transfer zone defined on one side by one of the pole pieces 18 or 32 and on the opposite side by the recording surface of a master diskette to be duplicated.

What is claimed is:

1. Apparatus for recording information on a flexible magnetic slave disk by contact transfer of information recorded on a flexible magnetic master disk, said apparatus comprising:
   a) an electromagnetic device terminating, respectively, at opposing ends in a first planar pole tip axially aligned with a second planar pole tip, and shaped to define predominately a single closed-loop flux-conducting path extending through a contact-transfer zone between said planar pole tips;
   b) means, associated with said first and second planar pole tips, for releasably mounting the slave disk in intimate facing relationship with the master disk in the contact-transfer zone between said planar pole tips;
   c) means for applying an alternating electrical control signal to said electromagnetic device to develop an alternating magnetic field in the closed-loop flux-conducting path that produces a corresponding alternating magnetic transfer field having a magnitude of between 1.75 and 1/1.75 times the coercivity of the master disk, said transfer field extending axially in the contact-transfer zone between said planar pole tips, to effect a pattern of magnetization on the slave disk that corresponds to the pattern of information recorded on the master disk; and
   d) the master disk and the slave disk further characterized wherein the master disk has an easy axis of magnetization in the plane of the master disk and a hard axis of magnetization orthogonal to the plane of the master disk and the slave disk has an easy axis of magnetization orthogonal to the plane of the slave disk.

2. Apparatus as defined in claim 1 wherein information recorded on the master disk is represented predominately by magnetization components oriented longitudinally substantially parallel with the plane of the master disk, whereby an alternating magnetic transfer field extending axially between said pole tips effects a pattern of vertical magnetization on the slave disk that corresponds to the pattern of longitudinal magnetization on the master disk.

3. Apparatus for recording information on a flexible magnetic slave disk by contact transfer of information recorded on a flexible magnetic master disk, said apparatus comprising:
  a) an electromagnetic device terminating, respectively, at opposing ends in a first planar pole tip axially aligned with a second movably mounted planar pole tip, and shaped to define predominately a single closed-loop flux-conducting path extending through a contact-transfer zone between said planar tips;
  b) actuator means, operably associated with said second planar pole tip, for releasably mounting the two flexible disks in the contact-transfer zone in intimate facing relationship with, respectively, said first and second planar pole tips;
  c) means for applying an alternating electrical signal to said electromagnetic device to develop an alternating magnetic field in the closed-loop flux-conducting path that produces a corresponding alternating magnetic transfer field extending axially in the contact-transfer zone between said planar pole tips, to effect a pattern of magnetization on the slave disk that corresponds to the pattern of information recorded on the master disk; and
  d) means for interlocking said actuator means with said means for applying an alternating electrical signal, whereby said means for applying an alternating electrical signal cannot be energized while said actuator means is being actuated.

4. Apparatus as defined in claim 3 wherein the surface area of each of said planar pole tips is comparable to the surface area of each of the flexible disks.

5. Apparatus as defined in claim 4 wherein each of said planar pole tips is circular, with a circumference that is greater than the circumference of each of the flexible disks.

6. Apparatus as defined in claim 3 wherein the master disk and the slave disk are mounted in intimate facing relationship with each other.

7. Apparatus as defined in claim 3 wherein:
  a) said electromagnetic device includes an aperture having an elongated magnetic member slidably located therein, said second planar pole tip being attached to a first end of said elongated member; and
  b) said actuator means includes an electrically driven actuator, coupled to a second opposing end of said elongated member, for slidably moving said second planar pole tip axially with respect to said first planar pole tip.

8. Apparatus for recording information simultaneously on opposing surfaces of a double-sided flexible magnetic slave disk by contact transfer of information recorded on a pair of flexible magnetic master disks, said apparatus comprising:
  a) an electromagnetic device terminating, respectively, at opposing ends in a first planar pole tip axially aligned with a second movably mounted planar pole tip, and shaped to define predominately a single closed-loop flux-conducting path extending through a contact-transfer zone between said planar pole tips;
  b) actuator means, operably associated with said second planar pole tip, for mounting the opposing surfaces of the double-sided slave disk in intimate facing relationship with, respectively, the two master disk in the contact-transfer zone between said planar pole tips;
  c) means for applying an alternating electrical control signal to said electromagnetic device to develop an alternating magnetic field in the closed-loop flux-conducting path that produces a corresponding alternating magnetic transfer field extending axially in the contact-transfer zone between said planar pole tips, to effect a pattern of magnetization on each opposing surface of the double-sided slave disk that corresponds to the pattern of information recorded, respectively, on each master disk; and
  d) said slave disk further having a substrate of sufficient thickness to prevent crosstalk from said master disks through said slave disk substrate.

* * * * *